United States Patent
Thorson et al.

(10) Patent No.: US 7,587,115 B1
(45) Date of Patent: Sep. 8, 2009

(54) INTEGRATED FUNCTIONALITY IN OPTICAL BACKPLANE

(75) Inventors: Kevin J. Thorson, Eagan, MN (US); Rick C. Stevens, Apple Valley, MN (US); Ryan L. Nelson, Farmington, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 104 days.

(21) Appl. No.: 11/606,513

(22) Filed: Nov. 30, 2006

(51) Int. Cl.
*G02B 6/00* (2006.01)

(52) U.S. Cl. ......... 385/135; 385/136; 385/137

(58) Field of Classification Search ......... None
See application file for complete search history.

(56) References Cited

U.S. PATENT DOCUMENTS

| | | | |
|---|---|---|---|
| 5,513,293 A | 4/1996 | Holland et al. | |
| 5,689,599 A | 11/1997 | Shahid | |
| 5,809,191 A | 9/1998 | Stevens et al. | |
| 5,883,998 A | 3/1999 | Stevens et al. | |
| 5,937,133 A | 8/1999 | Moss et al. | |
| 6,056,448 A | 5/2000 | Sauter et al. | |
| 6,069,991 A | 5/2000 | Hibbs-Brenner et al. | |
| 6,215,786 B1 | 4/2001 | Larson et al. | |
| 6,229,942 B1 | 5/2001 | Engberg et al. | |
| 6,301,247 B1 | 10/2001 | Larson et al. | |
| 6,442,318 B1 | 8/2002 | Goldman | |
| 6,504,841 B1 | 1/2003 | Larson et al. | |
| 6,583,415 B2 | 6/2003 | Stevens | |
| 6,736,547 B2 | 5/2004 | Stevens et al. | |
| 7,006,737 B2 | 2/2006 | Henschel et al. | |
| 2002/0051616 A1* | 5/2002 | Battey et al. | 385/135 |
| 2004/0228598 A1 | 11/2004 | Allen et al. | |
| 2005/0129379 A1 | 6/2005 | Reagan et al. | |
| 2005/0201707 A1 | 9/2005 | Glebov et al. | |
| 2006/0008231 A1 | 1/2006 | Reagan et al. | |
| 2006/0051015 A1 | 3/2006 | Look | |
| 2006/0165365 A1* | 7/2006 | Feustel et al. | 385/135 |
| 2007/0031100 A1* | 2/2007 | Garcia et al. | 385/135 |

* cited by examiner

*Primary Examiner*—Uyen Chau N Le
*Assistant Examiner*—Chad H Smith
(74) *Attorney, Agent, or Firm*—Mueting, Raasch & Gebhardt, P.A.

(57) ABSTRACT

A functional optical device for use in an optical backplane system is provided that includes one or more input fibers, one or more output fibers, and a functional portion configured to operate on an optical input received via the one or more input fibers to provide an optical output via the one or more output fibers. The one or more input fibers and the one or more output fibers of the functional optical device are terminated in a fixed configuration based on a fixed termination layout of at least one group of multiple fibers of an optical backplane interconnect.

20 Claims, 3 Drawing Sheets

INTEGRATED FUNCTIONALITY IN OPTICAL BACKPLANE

BACKGROUND OF THE INVENTION

The present invention relates generally to fiber optics. More particularly, the present invention relates to optical backplane systems, as well as methods and devices associated with such optical backplane systems.

Optical fiber has been widely accepted as an interconnection medium for communication networks, due mainly to the advantages offered by fiber, such as higher bandwidths and better noise performance, as compared to electrical media. For example, an optical network can be used to optically connect any number of optical nodes of a system. For example, an optical network can be used to connect a plurality of processors for interprocessor communication.

An optical backplane system is a structure including a variety of connectors facilitating the interconnection and communication of different systems and components. Generally, the optical backplane system is configured for the interconnection of systems and components having high bandwidth optical interfaces. Conventional optical backplanes, however, also can include electrical connections and suitable interface circuitry for interconnecting systems and components having electrical interfaces.

Conventionally, optical backplane interconnects used in the optical backplane systems have been bundled groupings of fibers to form cables which are terminated at various optical connector components to provide backplane signal connections between various connectors (e.g., connectors at modules and/or input and output (I/O) connectors). More recently, optical backplane interconnects used in optical backplane systems have been made as thin high density nets of fibers on flexible substrate (e.g., optical fiber flexible ribbons or interconnects) which are terminated at various optical connector components to provide backplane signal connections between various connectors (e.g., connectors at modules and/or input and output (I/O) connectors). Such optical backplane interconnects may be combined using suitable connectors with electrically routed printed wiring boards (e.g., with appropriate optical to electrical interfaces).

The optical elements in such optical backplane interconnects have been static point to point solutions for providing interconnectivity between and amongst various optical fiber connectors used in the backplane system (e.g., point to point connection between modules mounted in a backplane system, or between module or modules and I/O connectors of the system).

Functionality (e.g., active or passive modulation of light in the fibers) provided to the optical backplane system is conventionally provided with use of functional optical devices (e.g., attenuators, splitters, etc.) that are connectorized and attached to a net of harnessed cable assemblies providing point to point connection. Such assembly is generally difficult and costly.

For example, in the case of adding splitter functionality to an optical backplane, the splitters are generally individually designed as a single input and a variety of outputs. Such individually designed splitters are terminated with connectors and attached to a net of harnessed cable assemblies. The count of splitters does not need to be very large before such connectorization and attachment becomes bulky and cumbersome to package. Further, manufacturing costs of adding such functionality to the backplane is generally high due to the need to provide individualized connectability between fibers of the interconnect of the backplane and the functional device (e.g., inputs and outputs of a splitter).

SUMMARY OF THE INVENTION

The present invention, at least in one or more embodiments, provides the ability to effectively integrate passive and active functionality into an optical backplane system. For example, functional optical devices may be provided with a fixed configuration of input and output fibers that correspond to a fixed termination layout of one or more input fibers and one or more output fibers of an optical backplane interconnect of the system (e.g., such functional optical devices may then be fusion spliced to the optical backplane interconnect).

An optical backplane system according to one or more embodiments of the present invention includes an optical backplane interconnect that includes a plurality of optical fibers for providing an optical pathway between a plurality of optical nodes (e.g., connectors at modules, I/O connectors, etc.). The plurality of optical fibers include at least one group of multiple fibers with the multiple fibers being terminated in a fixed termination layout of one or more input fibers and one or more output fibers. The system further includes a functional optical device including one or more input fibers and a functional portion configured to operate on an optical input received via the one or more input fibers to provide an optical output via one or more output fibers of the functional optical device. The one or more input fibers and the one or more output fibers of the functional optical device are terminated in a fixed configuration based on the fixed termination layout of the at least one group of multiple fibers.

A functional optical device for use in an optical backplane system is also described. Typically, the backplane system includes an optical backplane interconnect including a plurality of optical fibers for providing an optical pathway between a plurality of optical nodes. The plurality of optical fibers include at least one group of multiple fibers terminated in a fixed termination layout of one or more input fibers and one or more output fibers. The functional optical device that may be integrated with the optical backplane interconnect includes one or more input fibers and one or more output fibers. A functional portion of the optical device is configured to operate on an optical input received via the one or more input fibers to provide an optical output via one or more output fibers. The one or more input fibers and the one or more output fibers of the functional optical device are terminated in a fixed configuration based on the fixed termination layout of the at least one group of multiple fibers.

A method for use in providing an optical backplane system according to the present invention is also provided. The method includes providing a plurality of optical nodes and an optical backplane interconnect. The optical backplane interconnect includes a plurality of optical fibers for providing an optical pathway between the plurality of optical nodes. The plurality of optical fibers include at least one group of multiple fibers terminated in a fixed termination layout of one or more input fibers and one or more output fibers. The method further includes providing a functional optical device that includes one or more input fibers and a functional portion configured to operate on an optical input received via the one or more input fibers to provide an optical output via one or more output fibers of the functional optical device. The one or more input fibers and the one or more output fibers of the functional optical device are terminated in a fixed configuration based on the fixed termination layout of the at least one group of multiple fibers. The one or more input fibers and the one or more output fibers of the functional optical device that are terminated in a fixed configuration and the fixed termination layout of the at least one group of multiple fibers are then fusion spliced (e.g., so as to integrate the functionality of the device into the optical backplane system).

In one embodiment of the system, device, and/or method, the one or more input fibers and the one or more output fibers of the functional optical device terminated in a fixed configuration are configured to be fusion spliced to the fixed termination layout of the at least one group of multiple fibers.

In another embodiment of the system, device, and/or method, the functional portion of the functional optical device is configured as one of an optical splitter, an optical attenuator, an optical switch, and an optical amplifier.

For example, the functional portion may be configured as an optical splitter, such as an optical splitter that includes 2n optical outputs, wherein n is an integer number of optical inputs. Further, for example, the optical splitter may be configured as a splitter patch, wherein an optical signal provided to the splitter patch via a group of n input fibers is split into two paths to provide a split output to two groups of n output fibers.

In another embodiment of the system, device, and/or method, the at least one group of multiple fibers are maintained in the fixed termination layout using a flexible substrate and/or the one or more input fibers and the one or more output fibers of the functional optical device are maintained in the fixed configuration using a flexible substrate.

Yet further, according to one embodiment of the system, device, and/or method, the one or more input fibers and the one or more output fibers of the functional optical device terminated in a fixed configuration are terminated with a first terminal connector component configured to be coupled to a second terminal connector component that terminates the at least one group of multiple fibers in the fixed termination layout.

The above summary of the present invention is not intended to describe each embodiment or every implementation of the present invention. Advantages, together with a more complete understanding of the invention, will become apparent and appreciated by referring to the following detailed description and claims taken in conjunction with the accompanying drawings.

DETAILED DESCRIPTION OF THE EMBODIMENTS

Figure 1:
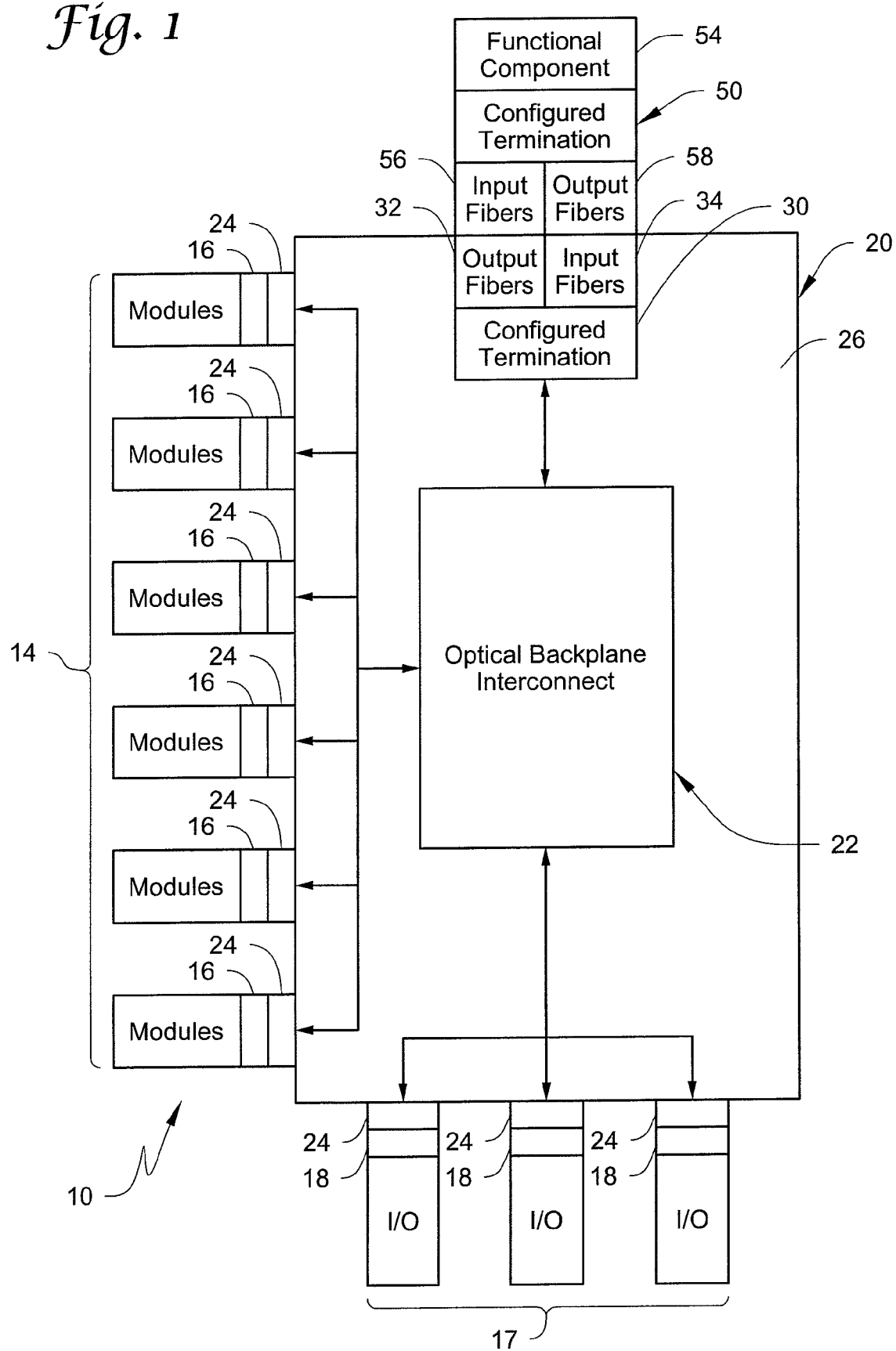
FIG. 1 shows an exemplary diagrammatic optical backplane system according to the present invention including an optical backplane interconnect providing optical pathway for connecting one or more optical nodes (e.g., modules and I/O's), and further including an integrated functional optical device.

Generally, an optical backplane system 10, according to the present invention, shall be described with reference to FIG. 1, along with a functional optical device 50 integrated therewith. One or more embodiments of the functional optical device 50 shall further be described in more detail with reference to FIGS. 2 and 3.

Generally, and as further described herein, optical backplane system 10 includes an optical backplane interconnect 20 for providing an optical pathway 22 between a plurality of optical nodes. The optical pathway 22 includes a plurality of optical fibers for use in optical signal transmission. Such optical fibers of the optical pathway 22 are terminated at a plurality of connector components 24 (e.g., ferrules used to terminate a plurality of fibers).

As used herein, an optical node may be any connection point associated with or otherwise connectable using the optical backplane system 10. For example, optical nodes may include one or more modules 14 associated with or including one or more connector components 16 suitably mounted or otherwise provided for connection to one or more connector components 24 of the optical backplane system 10. For example, such modules 14 may be suitably mounted on a rack or panel for ease in organization and connection.

Further, for example, an optical node may also include I/O connections or jacks 17 (e.g., input/output to associated processor components). Such I/O connections 17 may be, for example, associated with or include one or more connector components 18 suitably mounted or otherwise provided for connection to one or more connector components 24 of the optical backplane system 10. One skilled in the art will recognize that an optical node is generally used to describe any connection point associated with or otherwise connectable to the optical backplane system 10 and is not limited to modules and I/O connections.

Generally, in the past, signal interconnections in and amongst the optical connectors 24 were made by running and extending individual optical fibers from their respective ferrule terminations at one connector 24 to ferrule terminations at another connector 24. For example, one module may have multiple fibers connectable thereto, each of which are connected to an I/O 17, or, for example, an I/O 17 may have multiple fibers connectable thereto, each of which are terminated at one or more of the modules 14. In other words, the optical nodes 14, 17 may have any number of optical fibers of the optical pathway 22 connected thereto and/or amongst one another. After such point to point connections were made, in the past, the fibers would be bundled together to form separate cables, and in come cases some of the separate cables could be harnessed together.

More recently, such cabling has been replaced with optical fiber flexible ribbons or interconnects which are commercially available. For example, such flexible interconnects may include optical fibers or waveguides placed or otherwise provided on or embodied in a suitable substrate for communicating optical signals between various terminated ends thereof. For example, the plurality of waveguides or fibers may provide an optical pathway (e.g., a plurality of optical paths) between terminated ends of a plurality of fibers. The flexible substrate, or layers of flexible substrate having optical fibers therein, may be configured with optical fibers that provide point to point optical paths or more complex optical transmission paths (e.g., using cross-over or other light routing techniques).

Generally, for example, the flexible interconnects may include fibers being terminated at ferrules or other suitable connector components 24 such as those shown generally in FIG. 1 of the backplane optical interconnect 20. For example, the optical fibers of the optical pathway 22 are brought into the ferrules and coupled or otherwise connected to suitable contacts therein (e.g., a contact for connection to connector components 16 and 18).

Although not limited thereto, at least a portion of the optical backplane interconnect 20 includes the optical fibers of the optical pathway 22 in a fixed position within a substrate 26, e.g., a flexible substrate. Generally, the layout of the optical fibers therein is determined as required for implementing a particular design to accomplish the desired connection between the plurality of nodes in a particular system application (e.g., connection of multiple processors and various modules).

The optical backplane interconnect 20 includes the optical pathway 22 which employs a plurality of optical fibers to facilitate optical signal transmission. For example, the optical backplane interconnect may be provided as flexible ribbon interconnect, fibers embodied in one or more different materials, multiple layers of substrates or ribbons, etc. Materials such as flexible polyimide, laminate substrate, or encapsulations may be used to provide such an optical backplane interconnect 20.

As shown in FIG. 1, the optical backplane interconnect 20 includes the plurality of optical fibers for providing the optical pathway 22 between the plurality of optical nodes (e.g., connectors 16 at modules 14, I/O connectors 18, etc.). The plurality of optical fibers of the optical pathway 22 includes at least one group of multiple fibers 30 provided in a particular configured termination. In other words, the multiple fibers of the at least one group of fibers 30 are terminated in a fixed termination layout that includes one or more input fibers 34 and one or more output fibers 32. For example, during design, the fixed termination layout is set depending on the particular architecture desired for an application being implemented. For example, optical outputs may be for providing one or more signals that are to be attenuated or amplified and the optical inputs may be for receiving amplified or attenuated optical signals.

As shown generally in FIG. 1, at least one embodiment of the present invention provides a functional optical device 50 that is integrated into the optical backplane interconnect 20 or in other words, the optical interconnect 20 includes integrated functionality. The functional optical device 50 includes one or more input fibers 56 and a functional component portion 54 configured to operate on an optical input received via the one or more input fibers 56 to provide an optical output via one or more output fibers 58 of the functional optical device 50. The one or more input fibers 56 and the one or more output fibers 58 of the functional optical device 50 are terminated in a fixed configuration based on the fixed termination layout of the at least one group of configured multiple fibers 30 including input fibers 34 and output fibers 32.

The at least one group of multiple fibers 30 provided in the fixed termination layout that includes one or more input fibers 34 and one or more output fibers 32 is provided, in at least one embodiment, with a defined fusion splice pitch (e.g., a defined geometrical layout such as with a defined center to center spacing). The one or more input fibers 56 and the one or more output fibers 58 of the functional optical device 50 are terminated in a manner to match the fusion splice pitch of the optical fabric that includes the termination layout of the at least one group of multiple fibers 30.

With the fusion splice pitch of the functional optical device 50 being matched to the fusion splice pitch of the optical fabric that includes the termination layout of the at least one group of multiple fibers 30, the multiple fibers of the functional optical device 50 can be fusion spliced to the termination layout of the at least one group of multiple fibers 30. Fusion splicing of multiple fibers at the same time as opposed to individually is known in the art and is a common technique to provide such connection. For example, such fusion splicing may be performed using fusion splicers such as Fitel S198A, Fujikura FSM 30R, Sumitomo Type 61, etc. or any other fusion splicing technology known to one skilled in the art.

With use of fusion splicing, the functionality of the functional optical device 50 is integrated into the optical backplane system 10. Such fusion splicing improves the products' manufacturability (e.g., reduces manufacturing costs) and reparability. Further, optical loss is decreased when using suitable fusion splicing as opposed to the use of connectors.

One will recognize that the functional optical device may also be connectorized (e.g., terminated in a ferrule of a connector component) so as to be thereafter coupled to a mating connector component provided at the optical backplane interconnect 20. In other words, in one embodiment, as opposed to fusion splicing, a connector may be used to provide the coupling of the configured terminations of the functional optical device 50 to the configured termination of the group of multiple fibers 30. However, such fibers are still maintained in the configured terminations as described herein. The use of connectors may be part of a panel or module mounting the functional optical device 50 which is then connected to the group of multiple fibers 30 in the configured layout which is terminated by a connector component.

For example, in at least one embodiment, the one or more input fibers 56 and the one or more output fibers 58 of the functional optical device 50 terminated in a fixed configuration are terminated with a first terminal connector component configured to be coupled to a second terminal connector component that terminates the at least one group of multiple fibers 30 in the fixed termination layout.

The functional optical portion 54 of the functional optical device 50 may be configured as any passive or active optical device suitable for the desired application for which the optical backplane system 10 is designed. For example, functional portion 54 may be configured as one of an optical splitter, an optical attenuator, an optical switch, an optical multiplexer, an optical demultiplexer, and/or an optical amplifier. For example, splitting for data recording may be required or desirable in a system application, switching for reconfiguration or diagnostic and prognostic-interrogation may be required or desirable in a system application, or amplification for providing signal strength may be required or desirable in a system application. Any optical functionality may be incorporated into the optical backplane system 10 as described herein.

With respect to integration of an optical switch into the optical backplane system 10, for example, one may obtain commercial switch components including one or more input fibers and one or more output fibers. Such fibers may be arranged and combined to match a fusion splice pitch of the fixed termination layout of the group of multiple fibers 30. The input and output fibers of the optical switch, or other portions thereof as well, may be embodied in a substrate or material to maintain or otherwise hold the input and output fibers thereof in the matching fixed configuration suitably adapted to be fusion spliced to the group of multiple fibers 30. The switch may be operated either optically or electrically as desired.

Figure 2:
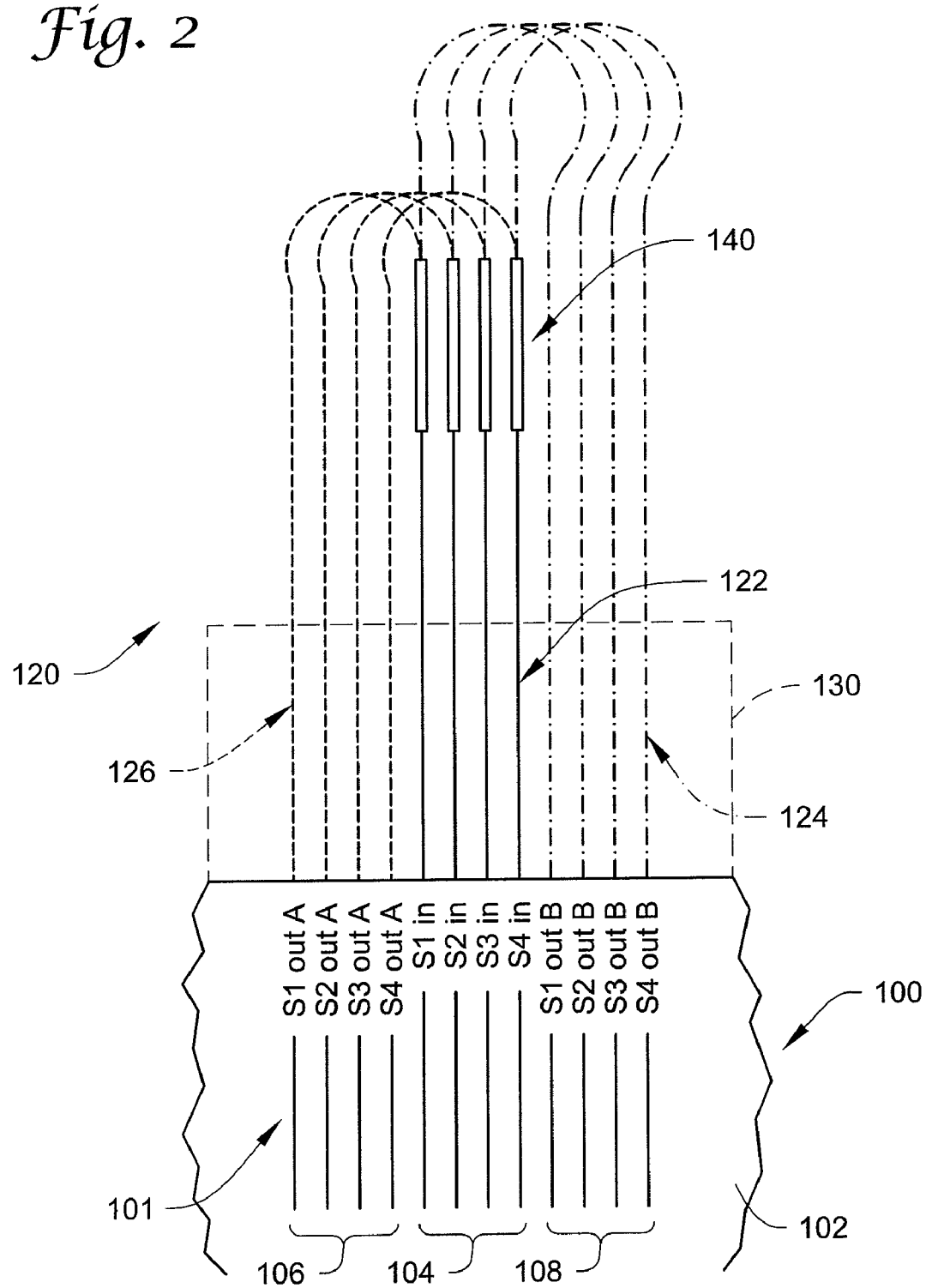
FIG. 2 shows one embodiment of an exemplary functional optical device such as that shown generally in FIG. 1 taking the form of an optical splitter.
Figure 3:
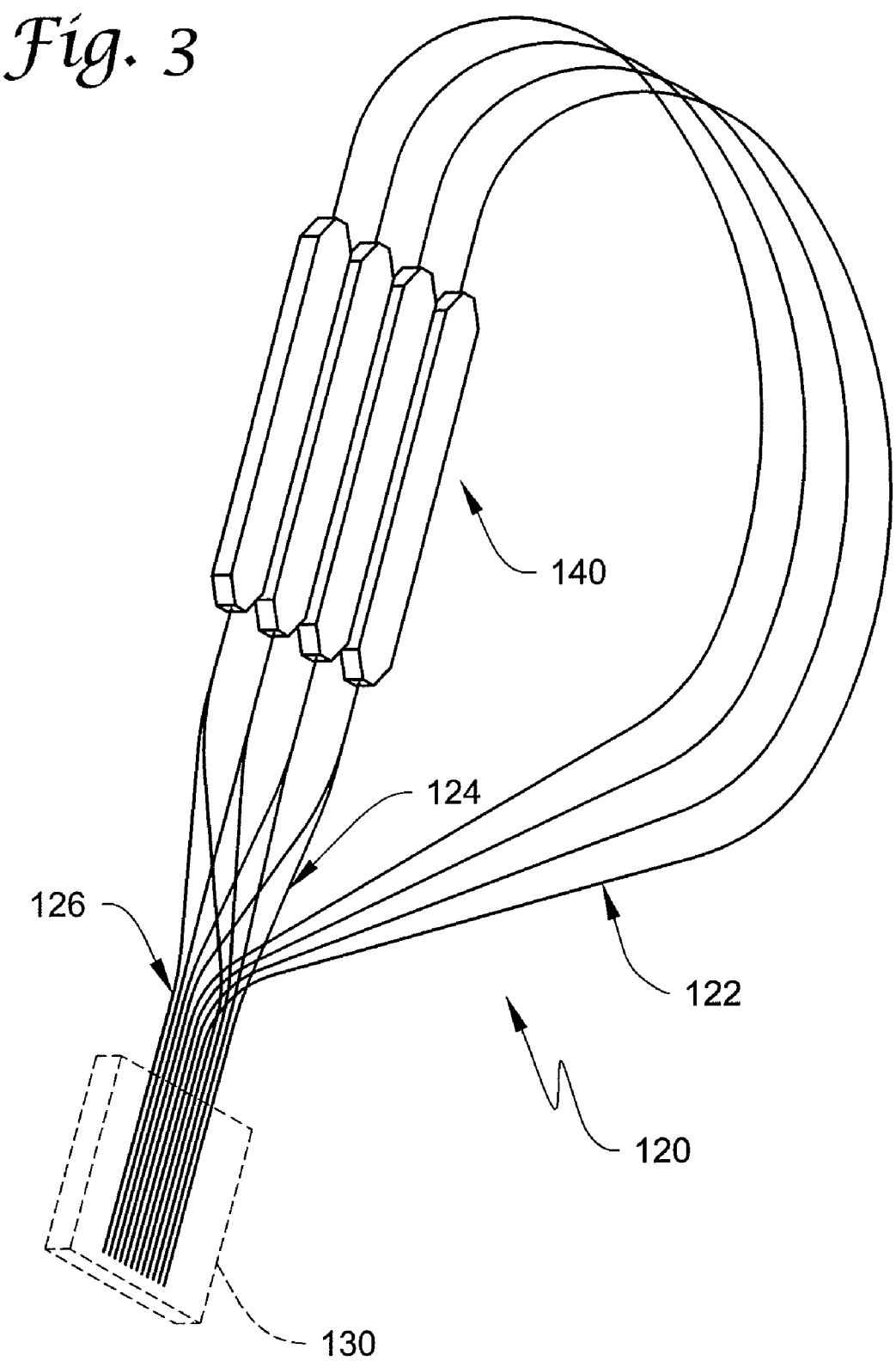
FIG. 3 shows one embodiment of an exemplary implementation of the functional optical device shown schematically in FIG. 2.

With respect to integration of an optical splitter into the optical backplane system 10, for example, FIG. 2 shows one schematic diagram of an embodiment of a splitter patch design that interfaces an optical fabric or a route in an optical backplane system 100 into two paths, and FIG. 3 shows one implementation of such a design. For example, such splitting may be desirable to route an additional output signal as an internal route for data collection or storage.

Although, one illustrative embodiment of a splitter device 120 is shown in FIGS. 2 and 3, any splitter configuration may be integrated in the optical backplane system 100. For example, the functional portion may be configured as an optical splitter that includes 2n optical outputs, wherein n is an integer number of optical inputs. Further, for example, the optical splitter may be configured as a splitter patch such as shown in FIG. 2, wherein an optical signal provided to the splitter patch via a group of n input fibers is split into two paths to provide a split output to two groups of n output fibers. Further, for example, any number of splitters may be integrated. However, for various reasons certain numbers may be advantageous. For example, certain numbers of fibers may be more easily fusion spliced using one or more different fusion techniques.

As shown in FIG. 2, at least one group of multiple fibers 101 are maintained in the fixed termination layout using a flexible substrate 102 of the optical backplane system 100. For example, four output fibers 104 providing an optical signal to the functional splitter device 120 are grouped together and combined with two groups of input fibers 106, 108 that receive a split optical signal from splitter device 120. At least in one embodiment, the flexible substrate 102 maintains the fibers 101 with a defined fusion splice pitch (e.g., defined spacing of the fibers).

Also as shown in FIG. 2, the functional splitter device 120 includes one or more input fibers 122 and the one or more output fibers 124, 126 maintained in a fixed configuration using a flexible substrate 130 of the splitter device 120. For example, four input fibers 122 receiving an optical signal are grouped together and combined with two groups of output fibers 124, 126 that provide the split optical signal from splitter device 120 back to the input fibers 106, 108 of the optical backplane system 100. At least in one embodiment, the flexible substrate 130 maintains the input fibers 122 and the output fibers 124, 126 with a defined fusion splice pitch (e.g., spacing of the fibers) to match the defined fusion splice pitch of the fibers 101.

As shown in FIG. 2, the design for this particular splitter patch device 120 is to use the twelve position ribbon arrangement using ribbon substrate 102 and populate four fibers as input fibers 104 to four splitters 140 of the splitter device 120 and the remaining eight fibers 106, 108 as receiving the outputs of the four splitter portions 140; two from each input. This is shown notationally in FIG. 2 with "S1 in" through "S4 in" representing the full optical strength signal and the other positions representing the split signals. For example, "S1 in" splits into "S1 out A" and "S1 out B," and so forth.

The split outputs may be of various percentages of the inputs depending on the splitters used. For example, such splits may be 50:50, 60:40, 70:30, or 90:10. There are also losses associated with the split channels. Therefore, for example, although the splitter portions are defined as 50:50, the actual power of each output signal is approximately 3.5 dB of the input signal. The selection of the splitters to be used is determined, at least in part, as part of the architecture and performance of the optical components thereof, such as transceivers with which they are employed.

Also as generally illustrated in FIG. 2, a single fuse operation could be employed to connect four splitters to the optical backplane system 100. This is compared to the case where a connectorized version is used and, for example, twelve separate terminations are required. As such, this approach of integration of the functionality into the optical backplane system 100 is clearly beneficial.

As shown in the implementation diagram of FIG. 3, one may obtain commercial splitter components 140 (e.g., individual splitters) including one or more input fibers 122 and one or more output fibers 124, 126. Such fibers may be arranged and combined to match a fusion splice pitch of the fixed termination layout of the group of multiple fibers 101. The input and output fibers 122, 124, and 126 of the optical splitter device 120 may be embodied in a substrate or material 130 to maintain or otherwise hold the input and output fibers 122, 124, and 126 thereof in the matching fixed configuration suitably adapted to be fusion spliced to the group of multiple fibers 101. For example, materials such as flexible polyimide and laminate substrates coated with thermal setting epoxies, two part epoxies, or acrylic adhesives or encapsulation molding materials may be used to maintain the fibers in a particular position.

One skilled in the art will recognize that various components may be used to implement the present invention in many different manners and that the specific devices described herein are provided only as exemplary configurations thereof. The present invention is limited in no manner to the components shown and/or described with reference to the specific implementations of the figures.

All patents and references cited herein are incorporated in their entirety as if each were incorporated separately. This invention has been described with reference to illustrative embodiments and is not meant to be construed in a limiting sense. As described previously, one skilled in the art will recognize that various other illustrative exemplary functional devices may be integrated as described herein. Various modifications of the illustrative embodiments, as well as additional embodiments of the invention and combinations of various elements and/or steps herein, will be apparent to persons skilled in the art upon reference to this description. It is therefore contemplated that the patented claims will cover any such modifications or embodiments that may fall within the scope of the present invention as defined by the accompanying claims.

What is claimed is:

1. An optical backplane system, the system comprising:
    an optical backplane interconnect comprising a plurality of optical fibers for providing an optical pathway between a plurality of optical nodes, wherein the plurality of optical fibers comprise at least one group of multiple fibers, wherein the at least one group of multiple fibers are terminated in a fixed termination layout of one or more input fibers and one or more output fibers, and further wherein one or more holding materials are used to hold the one or more input fibers and one or more output fibers of the optical backplane interconnect together in the fixed termination layout; and
    a functional optical device comprising one or more input fibers and a functional portion configured to operate on an optical input received via the one or more input fibers to provide an optical output via one or more output fibers of the functional optical device, wherein the one or more input fibers and the one or more output fibers of the functional optical device are terminated in a fixed configuration based on the fixed termination layout of the at least one group of multiple fibers, wherein one or more coupling materials are used to hold the one or more input fibers and one or more output fibers of the functional optical device together in the fixed configuration, wherein the at least one group of multiple fibers of the optical backplane are held together in the fixed termination layout by the one or more holding materials prior to connection to the functional optical device, and further wherein the one or more input fibers and one or more output fibers of the functional optical device are held together in the fixed configuration by the one or more coupling materials prior to being connected to the optical backplane interconnect.

2. The system of claim 1, wherein the one or more input fibers and the one or more output fibers of the functional optical device terminated in a fixed configuration are configured to be fusion spliced to the fixed termination layout of the at least one group of multiple fibers.

3. The system of claim 1, wherein the functional portion is configured as one of an optical splitter, an optical attenuator, an optical switch, and an optical amplifier.

4. The system of claim 3, wherein the functional portion is configured as an optical splitter.

5. The system of claim 4, wherein the optical splitter comprises 2n optical outputs, wherein n is an integer number of optical inputs.

6. The system of claim 5, wherein the optical splitter comprises a splitter patch, and further wherein an optical signal provided to the splitter patch via a group of n input fibers is split into two paths to provide a split output to two groups of n output fibers.

7. The system of claim 1, wherein the at least one group of multiple fibers are maintained in the fixed termination layout using a flexible substrate.

8. The system of claim 1, wherein the one or more input fibers and the one or more output fibers of the functional optical device are maintained in the fixed configuration using a flexible substrate.

9. The system of claim 1, wherein the one or more input fibers and the one or more output fibers of the functional optical device terminated in a fixed configuration are terminated with a first terminal connector component configured to be coupled to a second terminal connector component that terminates the at least one group of multiple fibers in the fixed termination layout.

10. A functional optical device for use in an optical backplane system, wherein the backplane system comprises an optical backplane interconnect comprising a plurality of optical fibers for providing an optical pathway between a plurality of optical nodes, wherein the plurality of optical fibers comprise at least one group of multiple fibers terminated in a fixed termination layout of one or more input fibers and one or more output fibers, wherein the functional optical device is separate from the optical backplane interconnect, and further wherein the functional optical device comprises:
one or more input fibers;
one or more output fibers; and
a functional portion configured to operate on an optical input received via the one or more input fibers to provide an optical output via one or more output fibers, wherein the one or more input fibers and the one or more output fibers of the functional optical device are terminated in a fixed configuration based on the fixed termination layout of the at least one group of multiple fibers, wherein one or more coupling materials are used to hold the one or more input fibers and one or more output fibers of the functional optical device together in the fixed configuration, and further wherein the one or more input fibers and one or more output fibers of the functional optical device are held together in the fixed configuration by the one or more coupling materials prior to being connected to the optical backplane interconnect.

11. The device of claim 10, wherein the one or more input fibers and the one or more output fibers of the functional optical device are configured to be fusion spliced to the fixed termination layout of the at least one group of multiple fibers.

12. The device of claim 10, wherein the functional portion is configured as one of an optical splitter, an optical attenuator, an optical switch, and an optical amplifier.

13. The device of claim 12, wherein the functional portion is configured as an optical splitter.

14. The device of claim 13, wherein the optical splitter comprises 2n optical outputs, wherein n is an integer number of optical inputs.

15. The device of claim 14, wherein the optical splitter comprises a splitter patch, and further wherein an optical signal provided to the splitter patch via a group of n input fibers is split into two paths to provide a split output to two groups of n output fibers.

16. The device of claim 10, wherein the one or more input fibers and the one or more output fibers of the functional optical device are maintained in the fixed configuration using a flexible substrate.

17. A method for use in providing an optical backplane system, the method comprising:
providing a plurality of optical nodes and an optical backplane interconnect comprising a plurality of optical fibers for providing an optical pathway between the plurality of optical nodes, wherein the plurality of optical fibers comprise at least one group of multiple fibers, wherein the at least one group of multiple fibers are terminated in a fixed termination layout of one or more input fibers and one or more output fibers, and further wherein one or more holding materials are used to hold the one or more input fibers and one or more output fibers of the optical backplane interconnect together in the fixed termination layout;
providing a functional optical device comprising one or more input fibers and a functional portion configured to operate on an optical input received via the one or more input fibers to provide an optical output via one or more output fibers of the functional optical device, wherein the one or more input fibers and the one or more output fibers of the functional optical device are terminated in a fixed configuration based on the fixed termination layout of the at least one group of multiple fibers, wherein one or more coupling materials are used to hold the one or more input fibers and one or more output fibers of the functional optical device together in the fixed configuration; and
fusion splicing the one or more input fibers and the one or more output fibers of the functional optical device terminated in the fixed configuration and the fixed termination layout of the at least one group of multiple fibers.

18. The method of claim 17, wherein the functional portion is configured as one of an optical splitter, an optical attenuator, an optical switch, and an optical amplifier.

19. The method of claim 18, wherein the functional portion is configured as an optical splitter.

20. The method of claim 17, wherein the at least one group of multiple fibers are maintained in the fixed termination layout using a flexible substrate, and further wherein the one or more input fibers and the one or more output fibers of the functional optical device are maintained in the fixed configuration using a flexible substrate.

* * * * *